US011625009B2

(12) United States Patent
Buerkle et al.

(10) Patent No.: US 11,625,009 B2
(45) Date of Patent: Apr. 11, 2023

(54) NON-UNIFORM OCCUPANCY GRID MANAGER

(71) Applicant: Intel Corporation, Santa Clara, CA (US)

(72) Inventors: Cornelius Buerkle, Karlsruhe (DE); Fabian Oboril, Karlsruhe (DE)

(73) Assignee: INTEL CORPORATION, Santa Clara, CA (US)

(*) Notice: Subject to any disclaimer, the term of this patent is extended or adjusted under 35 U.S.C. 154(b) by 380 days.

(21) Appl. No.: 16/830,491

(22) Filed: Mar. 26, 2020

(65) Prior Publication Data
US 2020/0225622 A1 Jul. 16, 2020

(51) Int. Cl.
G01S 13/42 (2006.01)
G05B 13/02 (2006.01)
G01S 13/04 (2006.01)
G01S 15/04 (2006.01)
G05D 1/02 (2020.01)
(Continued)

(52) U.S. Cl.
CPC .......... *G05B 13/0265* (2013.01); *G01S 13/04* (2013.01); *G01S 15/04* (2013.01); *G01S 17/04* (2020.01); *G05D 1/0088* (2013.01); *G05D 1/0214* (2013.01); *G06N 20/00* (2019.01); *B60W 60/001* (2020.02); *B60W 2420/42* (2013.01); *B60W 2420/52* (2013.01); *B60W 2420/54* (2013.01); *B60W 2520/10* (2013.01); *B60W 2520/105* (2013.01); *B60W 2520/12* (2013.01); *B60W 2520/125* (2013.01); *B60W 2552/05* (2020.02); *B60W 2554/406* (2020.02); *G05D 2201/0213* (2013.01); *G08G 1/16* (2013.01)

(58) Field of Classification Search
CPC .......... G01S 13/42; G01S 13/04; G01S 17/04; G01S 15/04; G06K 9/00791; G05B 13/02; G05D 1/02
See application file for complete search history.

(56) References Cited

U.S. PATENT DOCUMENTS

2015/0003683 A1* 1/2015 Grewe ................... G06V 20/58
382/104
2019/0047439 A1 2/2019 Natroshvili et al.
(Continued)

FOREIGN PATENT DOCUMENTS

WO 2018118071 A1 6/2018

OTHER PUBLICATIONS

Erdinc et al., The Bin-Occupancy Filter and its Connection to the PHD Filters, IEEE Transactions on Signal Processing, Nov. 2009, 13 pages, vol. 57, Issue: 11, IEEE.
(Continued)

Primary Examiner — Tan Q Nguyen
(74) Attorney, Agent, or Firm — Viering, Jentschura & Partner MBB

(57) ABSTRACT

An occupancy grid manager having a non-uniform occupancy which includes a plurality of cells, configurable in a plurality of cell sizes, each cell representing a region of an environment of a vehicle; and one or more processors, configured to determine one or more context factors; select a cell size for a cell of the plurality of cells based on the one or more context factors; process sensor data provided by one or more sensors; and determine a probability that the cell of the plurality of cells is occupied based on the sensor data.

20 Claims, 12 Drawing Sheets

(51) Int. Cl.
  *G05D 1/00* (2006.01)
  *G06N 20/00* (2019.01)
  *G01S 17/04* (2020.01)
  *G08G 1/16* (2006.01)
  *B60W 60/00* (2020.01)

(56) References Cited

U.S. PATENT DOCUMENTS

| | | | |
|---|---|---|---|
| 2019/0197029 A1 | 6/2019 | Gonzalez Aguirre et al. | |
| 2020/0103523 A1* | 4/2020 | Liu | G01S 13/931 |
| 2020/0365029 A1* | 11/2020 | Kourous-Harrigan | G08G 1/163 |
| 2020/0380270 A1* | 12/2020 | Cox | G06V 10/80 |
| 2021/0056712 A1* | 2/2021 | Daudelin | G06V 20/56 |

OTHER PUBLICATIONS

Elfes, Using Occupancy Grids for Mobile Robot Perception and Navigation, Computer, Jun. 1989, 12 pages, vol. 22, Issue 6, IEEE.

Tanzmeister et al., Evidential Grid-Based Tracking and Mapping, IEEE Transactions on Intelligent Transportation Systems, Jun. 2017, 14 pages, vol. 18, Issue 6, IEEE.

The Extended European search report for the corresponding European Patent Application No. 20206931.6, dated Apr. 9, 2021, 8 Pages (For informational purposes only).

Steyer et al.: "Grid-Based Environment Estimation Using Evidential Mapping and Particle Tracking"; IEEE Transactions on Intelligent Vehicles; Sep. 2018; pp. 384-396; vol. 3, No. 3.

Nuss et al.: "A Random Finite Set Approach for Dynamic Occupancy Grid Maps with Real-Time Application"; The International Journal of Robotics Research; Sep. 10, 2016; 20 pages.

Li et al.: "Building Variable Resolution Occupancy Grid Map from Stereoscopic System—a Quadtree based Approach"; IEEE Intelligent Vehicles Symposium (IV); Jun. 2013; 7 pages.

Dia et al: "Evaluation of Occupancy Grid Resolution through a Novel Approach for Inverse Sensor Modeling"; IFAC PapersOnLine; 2017; pp. 13841-13847.

Homm et al.: "Efficient Occupancy Grid Computation on the GPU with Lidar and Radar for Road Boundary Detection"; IEEE Intelligent Vehicles Symposium; Jun. 21-24, 2010; 8 pages.

Droeschel et al.: "Conrinuous Mapping and Localization for Autonomous Navigation in Rough Terraing using a 3D Laser Scanner"; Elsevier Robotics and Autonomous Systems; Oct. 27, 2016; 20 pages.

* cited by examiner

FIG 8

| | | | | | | | | |
|---|---|---|---|---|---|---|---|---|
| 32 | 33 | 34 | 35 | 36 | 37 | 39 | 40 | 41 |
| 42 | 43 | 44 | 45 | 46 | 47 | 49 | 50 | 51 |
| 72 | 73 | 74 | 0 | 1 | 2 | 4 | 90 | 91 |
| 75 | 76 | 77 | 5 | 6 | 7 | 9 | 92 | 93 |
| 78 | 79 | 80 | 12 | 13 | 14 | 16 | 94 | 95 |
| 81 | 82 | 83 | 18 | 18 | 19 | 21 | 96 | 97 |
| 84 | 85 | 86 | 22 | 23 | 24 | 26 | 98 | 99 |
| 87 | 88 | 89 | 27 | 28 | 29 | 31 | 100 | 101 |
| 52 | 53 | 54 | 55 | 56 | 57 | 59 | 60 | 61 |
| 62 | 63 | 64 | 65 | 66 | 67 | 69 | 70 | 71 |

NON-UNIFORM OCCUPANCY GRID MANAGER

TECHNICAL FIELD

Various aspects of this disclosure generally relate to the configuration of an occupancy grid having two or more regions of differing cell sizes.

BACKGROUND

Occupancy grids may be conventionally used for environmental perception in robotics (incl. driving automation). Occupancy grids may be used to determine from sensor data a probability that an area on a map relative to a vehicle is occupied. Existing occupancy grid solutions permit a robot to map the occupancy of a landscape (including a changing landscape, when using a dynamic occupancy grid), albeit at significant computational cost, which results in significant demands on both processors and memory.

To overcome this computational challenge, quadtree structures (or other tree-structures, i.e., octrees) have conventionally been used to create a grid-like map with non-uniform cell sizes. These quadtree structures permit the use of high resolution where it is desired, and a coarser resolution where high precision is not required. Thus, the quadtree structures represent a compromise between higher precision and reduced computational costs.

Such quadtree structures require combinations of cells into cells of a higher order; however, such combinations are only possible in a quadtree structure if all nodes have the same value. Therefore, the amount of data reduction depends on the state of the environment and comes at the price of the additional overhead to manage the dynamic data structure. Moreover, tree-based representations can only be applied to binary state representations, i.e. in situations in which a cell is either certain to be either free or occupied. If the cell value represents a probability of occupancy, as is usually the case, a combination of cells is no longer easily possible.

In light of the shortcomings of a tree structure, a polar grid representation may be conventionally implemented; however, such a structure necessitates conversions into the Cartesian space, requires additional processing power, and generally does not simplify the overall computational cost.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 8 depicts the application of a mapping function to the Cartesian space;

DESCRIPTION

Figure 1:
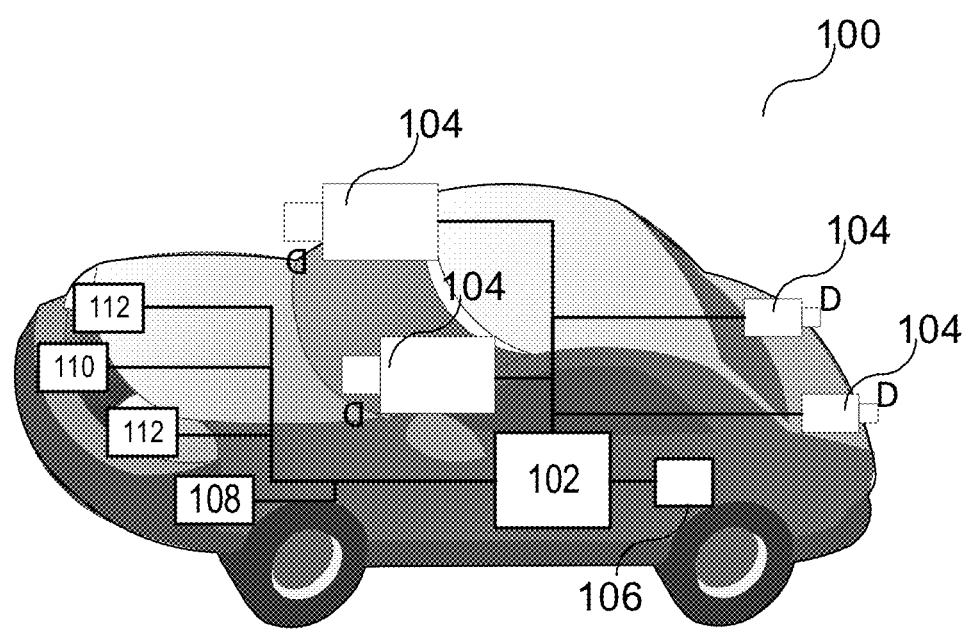
FIG. 1 depicts an exemplary autonomous vehicle in accordance with various aspects of the present disclosure.

The following detailed description refers to the accompanying drawings that show, by way of illustration, exemplary details and aspects of the disclosure in which aspects of the present disclosure may be practiced.

The word "exemplary" is used herein to mean "serving as an example, instance, or illustration". Any aspect of the disclosure or design described herein as "exemplary" is not necessarily to be construed as preferred or advantageous over other aspects of the disclosure or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, as described above, which is configured to traverse the ground, e.g., on a street, on a road, on a track, on one or more rails, off-road, etc.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle such as the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects of the disclosure herein may utilize one or more machine learning models to perform or control functions of the vehicle (or other functions described herein). The term "model" may, for example, used herein may be understood as any kind of algorithm, which provides output data from input data (e.g., any kind of algorithm generating or calculating output data from input data). A computing system may execute a machine learning model to progressively improve performance of a specific task. In some aspects, the computing system may adjust parameters of a machine learning model during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

Throughout this present disclosure, groupings of occupancy grid (static or dynamic) cells are referred to as sections or regions of cells. These sections or regions are often described in terms of their cell density, their resolution, and/or their cell size. For the purposes of this disclosure, these terms generally describe the same feature. That is, a cell density may refer to a quantity of cells per unit of area. A cell resolution may refer to a smallness of cell size in a given section or region. A cell size may refer to an area dimension of one or more cells. As cell density increases, the corresponding resolution increases, and the cell size decreases.

FIG. 1 shows an exemplary vehicle, namely vehicle 100, in accordance with various aspects of the present disclosure. In some aspects, vehicle 100 may include one or more processors 102, one or more image acquisition devices 104, one or more position sensors 106, one or more speed sensors 108, one or more radar sensors 110, and/or one or more LIDAR sensors 112.

In some aspects, vehicle 100 may include a safety system 200 (as described with respect to FIG. 2 below). It is appreciated that vehicle 100 and safety system 200 are exemplary in nature and may thus be simplified for explanatory purposes. Locations of elements and relational distances (as discussed above, the figures are not to scale) are provided as examples and are not limited thereto. The safety system 200 may include various components depending on the requirements of a particular implementation.

Figure 2:
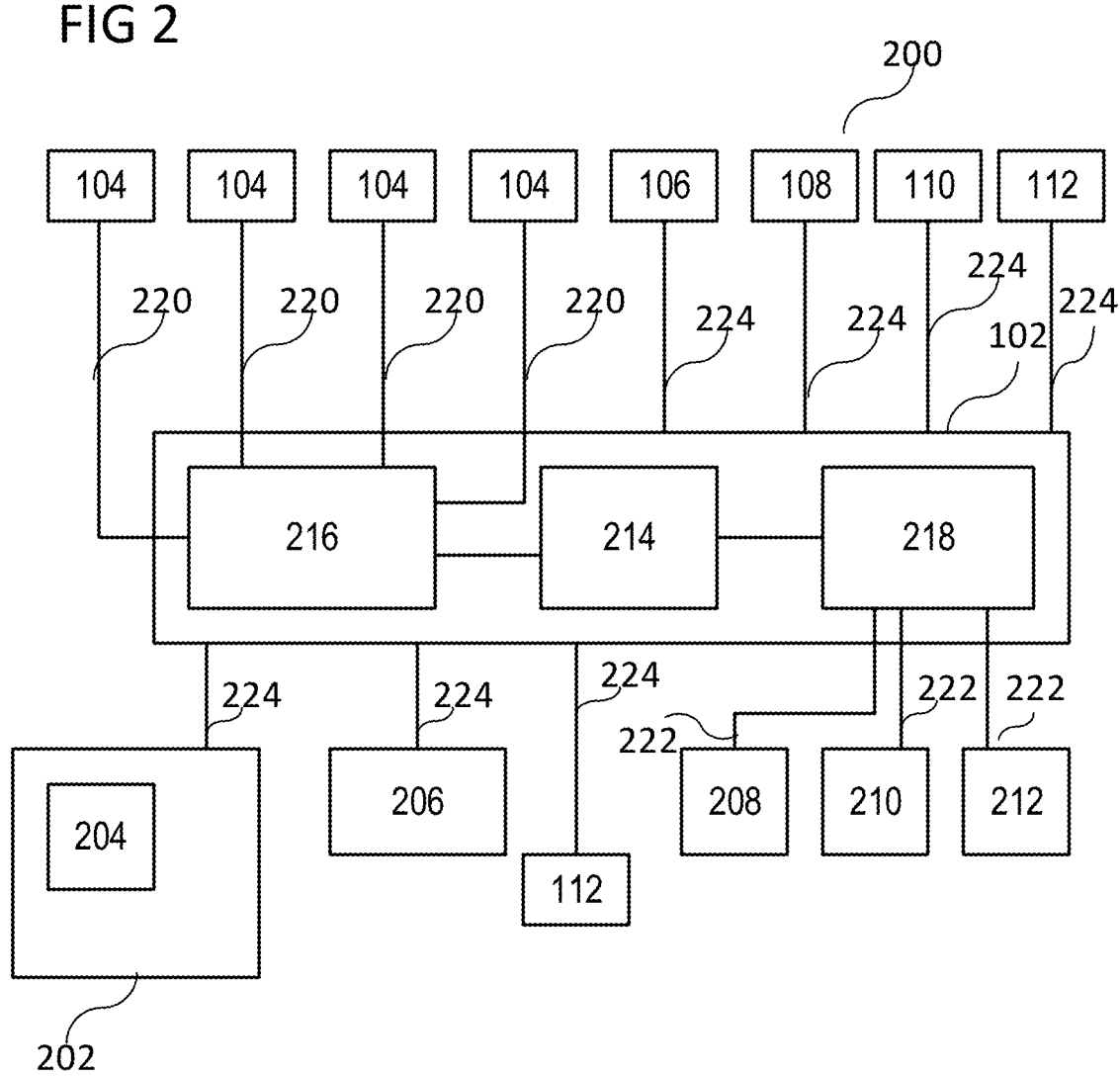
FIG. 2 depicts various exemplary electronic components of a safety system of the vehicle in accordance with various aspects of the present disclosure.

FIG. 2 shows various exemplary electronic components of a vehicle, namely safety system 200, in accordance with various aspects of the present disclosure. In some aspects, the safety system 200 may include one or more processors 102, one or more image acquisition devices 104 (e.g., one or more cameras), one or more position sensors 106 (e.g., a Global Navigation Satellite System (GNSS), a Global Positioning System (GPS), among others) one or more speed sensors 108, one or more radar sensors 110, and/or one or more LIDAR sensors 112. According to at least one aspect, safety system 200 may further include one or more memories 202, one or more map databases 204, one or more user interfaces 206 (e.g., a display, a touch screen, a microphone, a loudspeaker, one or more buttons and/or switches, etc.), and/or one or more wireless transceivers 208, 210, 212. The wireless transceivers 208, 210, 212 may, in some aspects, be configured according to the same, different, or any combination thereof radio communication protocols or standards. By way of example, a wireless transceiver (e.g., a first wireless transceiver 208) may be configured in accordance with a Short Range mobile radio communication standard (e.g., Bluetooth, Zigbee, among others). As another example, a wireless transceiver (e.g., a second wireless transceiver 210) may be configured in accordance with a Medium or Wide Range mobile radio communication standard (e.g., 3G (e.g. Universal Mobile Telecommunications System—UMTS), 4G (e.g. Long Term Evolution—LTE), and/or 5G mobile radio communication standard in accordance with corresponding 3GPP ($3^{rd}$ Generation Partnership Project) standards, among others). As a further example, a wireless transceiver (e.g., a third wireless transceiver 212) may be configured in accordance with a Wireless Local Area Network communication protocol or standard (e.g., IEEE 802.11, 802.11, 802.11a, 802.11b, 802.11g, 802.11n, 802.11p, 802.11-12, 802.11ac, 802.11ad, 802.11ah, among others). The one or more wireless transceivers 208, 210, 212 may be configured to transmit signals via antenna system over an air interface.

In some aspect, the one or more processors 102 may include an application processor 214, an image processor 216, a communication processor 218, and/or any other suitable processing device. Image acquisition device(s) 104 may include any number of image acquisition devices and components depending on the requirements of a particular application. Image acquisition devices 104 may include one or more image capture devices (e.g., cameras, CCDs (charge coupling devices), or any other type of image sensor).

In at least one aspect, the safety system 200 may also include a data interface communicatively connecting the one or more processors 102 to the one or more image acquisition devices 104. For example, a first data interface may include any wired and/or wireless first link 220 or first links 220 configured to transmit image data acquired by the one or more image acquisition devices 104 to the one or more processors 102 (e.g., to the image processor 216).

The wireless transceivers 208, 210, 212 may, in some aspects, be coupled to the one or more processors 102 (e.g., to the communication processor 218) via, for example a second data interface. The second data interface may include any wired and/or wireless second link 222 or second links 222 configured to transmit radio transmitted data acquired by wireless transceivers 208, 210, 212 to the one or more processors 102, e.g., to the communication processor 218.

In some aspects, the memories 202 as well as the one or more user interfaces 206 may be coupled to each of the one or more processors 102, e.g., via a third data interface. The third data interface may include any wired and/or wireless third link 224 or third links 224. Furthermore, the position sensor 106 may be coupled to each of the one or more processors 102, e.g., via the third data interface.

Such transmissions may also include communications (e.g., one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when executed by a processor (e.g., by the one or more processors 102), controls the operation of the system, e.g., the safety system. A memory of the one or more memories 202 may store one or more databases and image processing software, as well as a trained system, such as a neural network, or a deep neural network, for example. The one or more memories 202 may include any number of random access memories, read only memories, flash memories, disk drives, optical storage, tape storage, removable storage and other types of storage.

In some aspects, the safety system 200 may further include components such as a speed sensor 108 (e.g., a speedometer) for measuring a speed of the vehicle 100. The safety system may also include one or more accelerometers (either single axis or multiaxis) (not shown) for measuring accelerations of the vehicle 100 along one or more axes. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), and the like. The radar sensors 110 and/or the LIDAR sensors 112 may be configured to provide pre-processed sensor data, such as radar target lists or LIDAR target lists. The third data interface may couple the speed sensor 108, the one or more radar sensors 110 and the one or more LIDAR sensors 112 to at least one of the one or more processors 102.

The one or more memories 202 may store data, e.g., in a database or in any different format, that, e.g., indicate a location of known landmarks. The one or more processors 102 may process sensory information (such as images, radar signals, depth information from LIDAR or stereo processing of two or more images) of the environment of the vehicle 100 together with position information, such as a GPS coordinate, a vehicle's ego-motion, etc., to determine a current location of the vehicle 100 relative to the known landmarks, and refine the determination of the vehicle's location. Certain aspects of this technology may be included in a localization technology such as a mapping and routing model.

The map database 204 may include any type of database storing (digital) map data for the vehicle 100, e.g., for the safety system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In such aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the safety system 200 may include a driving model, e.g., implemented in an advanced driving assistance system (ADAS) and/or a driving assistance and automated driving system. By way of example, the safety system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving (ground) vehicles.

The vehicle 100 may include the one or more processors 102 e.g. integrated with or separate from an engine control unit (ECU) of the vehicle 100.

The safety system 200 may in general generate data to control or assist to control the ECU and/or other components of the vehicle 100 to directly or indirectly control the driving of the vehicle 100.

Occupancy grid mapping commonly uses one or more procedures to generate maps from sensor measurement data (e.g., data that may be noisy or uncertain) based on a known vehicle (which may be referred to as an "ego vehicle") pose. The occupancy grid may represent a map of a vicinity of the vehicle as a field of binary variables, representing the presence or an absence of an obstacle at that location in the vehicle's vicinity, or as a likelihood of the presence or absence of the obstacle at that location in the vehicle's vicinity. An occupancy grid may be employed to represent a dynamic environment around the vehicle.

Occupancy grids are conventionally used for environmental perception in robotics, including in driving automation. One current drawback of occupancy grids, however, is their comparatively large computational cost (e.g., regarding memory demands and CPU computational demands). These computational demands may require costly processors and memory. The computational demands may further consume significant time resources, which may be particularly meaningful in autonomous driving circumstances, in which time budgets may be restrictive.

One conventional strategy for mitigating the computational cost of occupancy grids is to use Graphics Processing Unit (GPU)-based accelerators. Although GPU-accelerators can improve overall processing speed of an occupancy grid, they again require additional cost, which may be undesirable.

Another conventional strategy to mitigate the computational cost of occupancy grids has been to process the grid with the use of non-uniform cell sizes using quadtrees. This strategy allows the vehicle to use only a high cell resolution (i.e., a high cell density) where it is needed, while permitting the vehicle to use a coarser resolution (i.e., a lower cell density) where high precision is not required. Use of a lower resolution/a lower cell density may result in reduced computational costs, since reducing the resolution/density reduces the number of cells for which an occupancy should be calculated. As stated above, current strategies for reducing resolution rely on quadtree representations. Quadtrees are tree data structures that include nodes, wherein each node has four children.

Cells of a quadtree may only be combinable to a higher level if all leaf nodes have the same value. This can be a significant hindrance when employing quadtrees (or octrees, or any other such technology) to operate a grid having regions of different resolutions. Otherwise stated, the amount of data reduction available through a quadtree depends on the state of the environment and comes at the price of the additional overhead to manage the dynamic data structure.

Another restriction is that such a tree-based representations may only be applicable to binary state representations, i.e. if a cell can e.g. be totally free or occupied, rather than if the grid is designed such that the cell values represent a probability. As probability-based grids are the standard, it becomes very difficult to combine cells within a grid. Alternatively, a polar grid representation may conventionally be used to represent multiple resolutions within the same grid; however, this necessitates conversions into the Cartesian space, which may result in an unsatisfactory reduction of the computational cost.

Herein is proposed a non-uniform occupancy grid that permits the grid to operate with at least two resolutions simultaneously. This occupancy grid may be configured to map sensor data analyzed in Cartesian space into a consecutive memory array. The occupancy grid may be further configured to dynamically reconfigure the non-uniform grid design at runtime for different use-cases/scenarios.

Occupancy grids have been conventionally used in robotics and autonomous systems that represent a static environment. Moreover, occupancy grids, which permit the incorporation and tracking of information of dynamic environments in a grid representation, may also be conventionally utilized.

Occupancy grids may conventionally operate by dividing the environment into cells of the same size (i.e. uniform grids) and storing information about the occupancy of the represented area in an array structure representing the cells. Occupancy grids may require significant processing power for their operation. Uniform occupancy grids may require significant resources for areas or sections of the grid that may not require a high-resolution to maintain an acceptable level of safety. For example, the amount of memory required to store the information in a uniform occupancy grid increases quadratically with the distance from the ego object. Moreover, the computational resources required to process this information increase with the amount of cells used (e.g. a cell density).

Another aspect is that the distance resolution of sensor information is by its nature non-uniform. For example, lidar data, which is a conventionally-used sensor for occupancy grids, provides a data as a plurality of rays, arranged outward from the lidar sensor(s). The angle between the rays is fixed, which results in an increase in a distance between the rays, as distance from the sensor increases. Information for objects that are comparatively far away from the lidar sensor(s) may become somewhat sparse. This may be accounted for in an autonomous system by decreasing the precision requirements for the information, as the distance from the sensor(s)/the autonomous system increases.

These differing requirements for precision can be seen, for example, in path planning. Path planning may include the finding of a continuous path on which the robot or autonomous vehicle may travel from a start location (e.g. its current location) to a goal or an end destination. Path planning may require an accurate estimate of the obstacle dimensions in the near or immediate surroundings of a robot or autonomous vehicle; however, a lower level of precision may be acceptable for objects that are further away.

Non-uniform occupancy grids can account for these differences in the precision-requirements. According to an aspect of the disclosure, and occupancy grid may include two or more areas of differing cell densities/cell resolutions/cell sizes. The occupancy grid manager may selected areas and/or the cell densities/resolutions/sizes according to any desired criteria, without limitation. As a non-limiting example, the occupancy grid may include a higher cell density/higher resolution/lower cell size in an area surrounding or near to the vehicle, and the occupancy grid may include a lower cell density/lower resolution/greater cell size in an area farther away from the vehicle. This strategy may achieve several advantages. First, including a section of a lower cell density/lower resolution/greater cell size may significantly reduce the number of cells required for the occupancy grid. This reduction of cells improves processing efficiency and storing efficiency (e.g. memory efficiency). The reduction of a number of cells in desired areas corresponds more closely to the real density of sensor information. The occupancy grid manager may tailor a reduction of the number of cells in desired areas to correspond to a required resolution of given information. Moreover, the strategies permit an adaptable occupancy grid formation, in which cell density is selected based on one or more use-case factors. For example, the number of cells that are used, the cell size, the cell density, and at which distance the cells are from a vehicle may all be defined as being use-case dependent.

Figure 3:
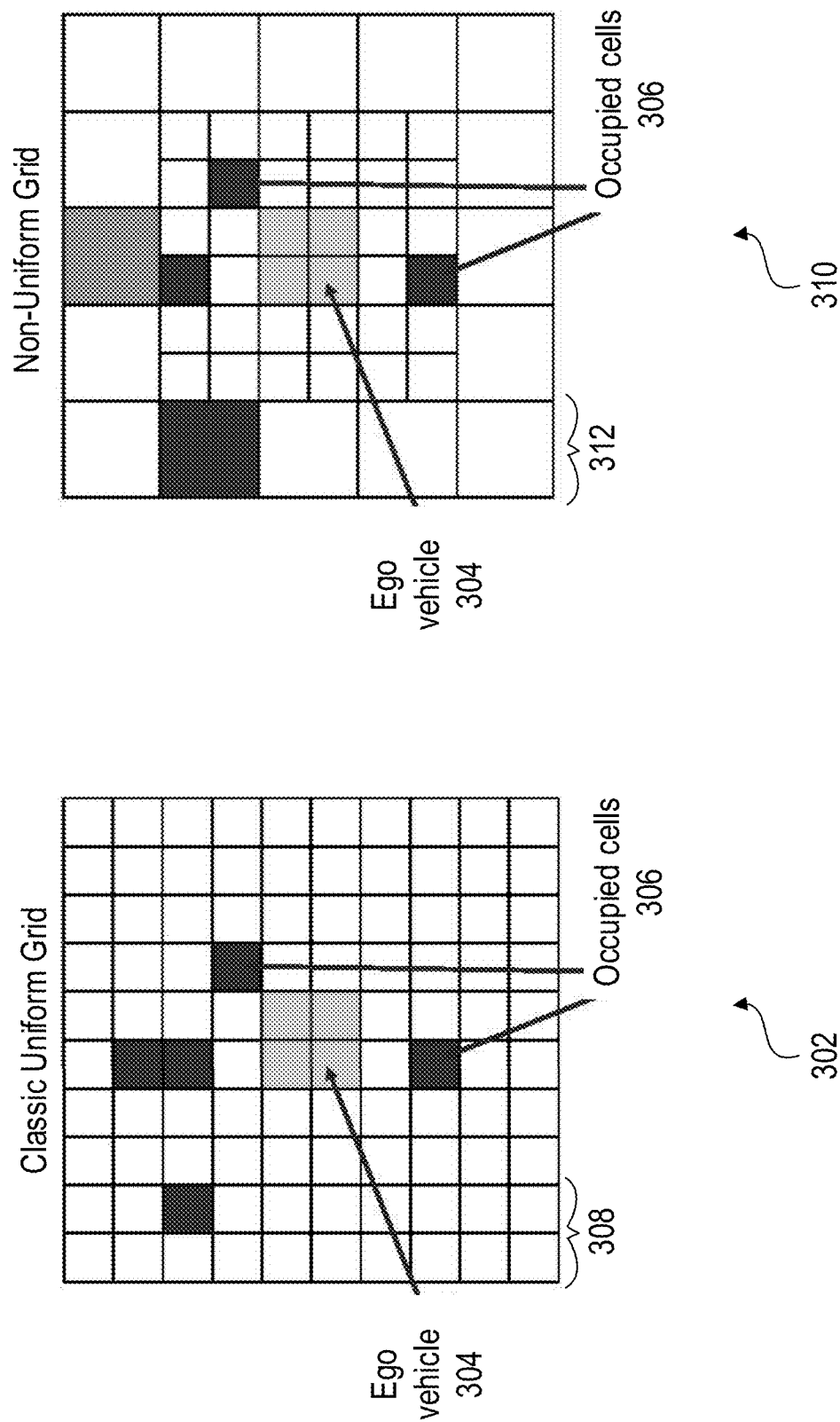
FIG. 3 depicts a comparison of a uniform occupancy grid of a non-uniform occupancy grid.

FIG. 3 depicts a comparison of a uniform occupancy grid of a non-uniform occupancy grid. In this case, a uniform occupancy grid is shown as 302, the uniform occupancy grid 302 including one or more cells representing a position of the vehicle 304; and one or more occupied cells (e.g. shaded cells) 306. Of note for the uniform occupancy grid 302, each occupancy cell is of a uniform size, such that the uniform occupancy grid maintains a consistent cell density throughout. For example, the cells marked as 308 have the same cell size as all other cells within the uniform grid.

A non-uniform grid is shown as 310, which includes one or more cells for a vehicle 304, and one or more occupied cells 306. In this case, the cell marked as 312 is in the same portion of the grade as the cells marked as 308. It can be seen that the cell marked as 312 is significantly larger (e.g. approximately four times larger) than the cells marked as 308. More importantly, the cells 312 are of a different size from other cells within the non-uniform grid, such as the cells for vehicle 304 and the occupied cells 306. Thus, the non-uniform grid includes cells of different cell sizes. Otherwise stated, the non-uniform grid includes regions or sections having differing cell densities/differing resolutions/differing sizes.

Figure 4:
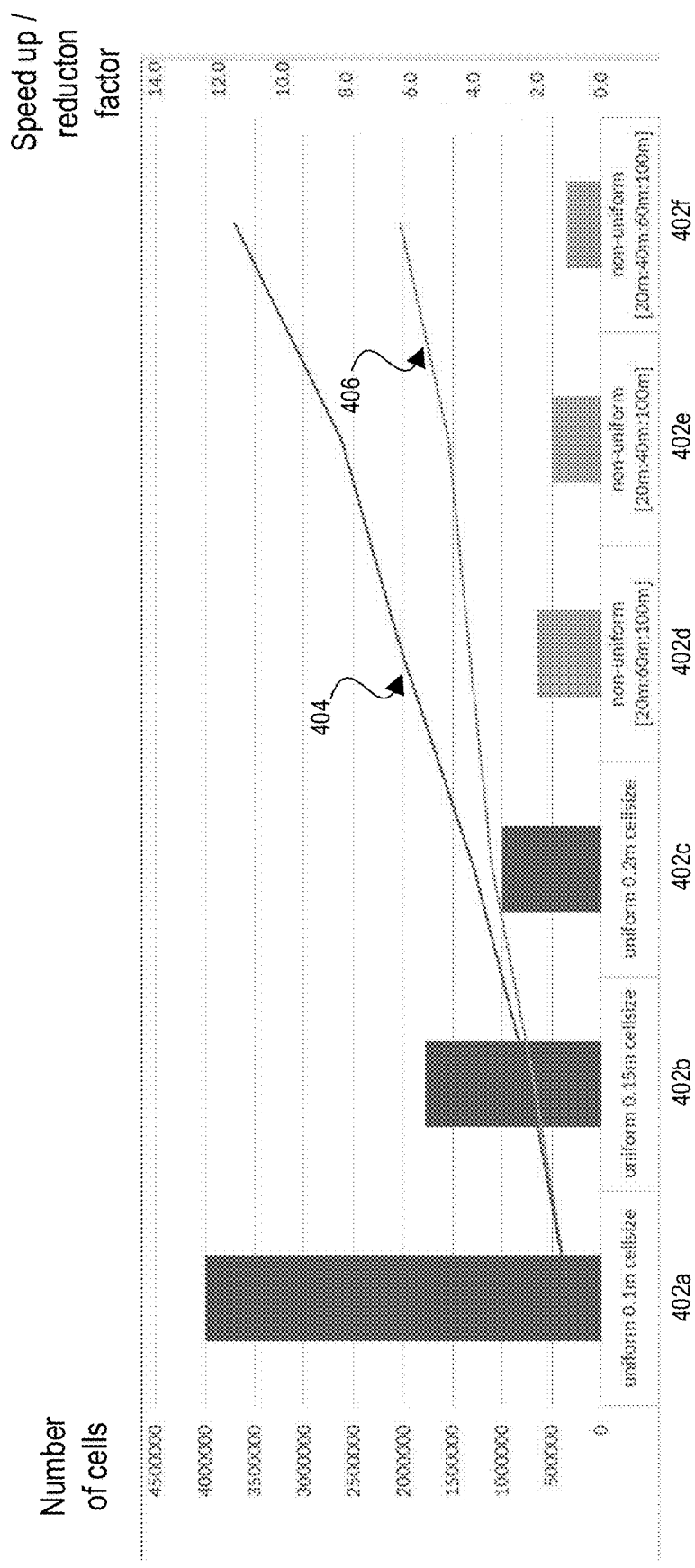
FIG. 4 depicts a cell requirement and a speed up/reduction factor corresponding to cell size/cell group size for uniform and non-uniform occupancy grid implementations.

FIG. 4 depicts a speed up/reduction factor associated with uniform occupancy grids versus non-uniform occupancy grids. Six occupancy grids (three uniform occupancy grids and three non-uniform occupancy grids) were tested. The six occupancy grids included a uniform occupancy grid with a 0.1 m cell size 402a; a uniform occupancy grid with a 0.15 m cell size 402b; a uniform occupancy grid with a 0.2 m cell size 402c; a non-uniform occupancy grid including 20 m/60 m/100 m cell sizes 402d; a non-uniform occupancy grid including 20 m/40 m/100 m cell sizes 402e; and a non-uniform occupancy grid including 20 m/40 m/60 m/100 m cell sizes 402f. The numbers of cells in each of the occupancy grids 402a through 402f are depicted as vertical columns. A reduction of memory resources required to operate the corresponding occupancy grid is depicted as 404. An increase of speed of execution time required to operate the corresponding occupancy grid is depicted as 406.

With respect to the uniform cell grids, it is axiomatic that an increase in cell size corresponds to a decrease in the number of cells necessary to implement the occupancy grids, as is evidenced from 402a, 402b, and 402c. As can be seen in 402d, 402e, and 402f, the use of non-uniform occupancy grids can further reduce the number of cells necessary to implement the occupancy grid. Moreover, incorporating additional cell groups (i.e., regions of cells of a different cell size/cell density/or cell resolution from other cell groups) and/or cell groups with larger cell sizes (reduced cell densities or diminished cell resolution), the number of cells necessary can be further reduced. Moreover, line 404 shows an increasing memory reduction factor as cell groups of larger cell sizes/additional cell groups are introduced. That is, the amount of memory resources necessary to operate the occupancy grid diminishes from 402a to 402f. Finally, 406 shows that the speed with which the occupancy grid may be operated increases from 402a to 402f.

In a distance-based cell density configuration, the areas of varying cell densities may be arranged in any manner desired for the given implementation. According to one aspect of the disclosure, a region in front of the vehicle may have a greater cell density (a higher resolution) then an area behind the vehicle. This may be due to the fact that, as the vehicle travels in a forward direction, the area in front of the vehicle may be of greater interest than an area behind the vehicle, and it may be desired to increase the resolution within this area of greater interest.

According to another aspect of the disclosure, a region closer to the vehicle may have a greater cell density (a higher resolution) than a region away from the vehicle, which may have a lesser cell density (lower resolution). For example, objects in close proximity to the vehicle may be of greater interest to the vehicle then objects in a farther proximity to the vehicle. That is, as the vehicle moves within a given environment, the vehicle will be required to perform a variety of tasks (e.g. obstacle recognition, obstacle avoidance, path planning, etc.). Because safety may be of primary importance in vehicle operation, the tasks that the vehicle is tasked to perform may be prioritized, such that safety is emphasized over other priorities. By processing an environment in close proximity to the vehicle with a greater cell density (higher resolution) then an area farther away from the vehicle, the vehicle may be better able to identify and avoid obstacles in close proximity. Moreover, this arrangement may mirror the availability of sensor data, as described above (e.g. with respect to rays of lidar data).

In addition to configuring the non-uniformity based on distance, as described above, the non-uniform occupancy grid make be configured with areas having different cell densities/different resolutions/different sizes based on other possible scenarios/factors.

First, the one or more processors may select a non-uniformity structure based on vehicle velocity. For example, when a vehicle is operating slowly, the vehicle may have ample time to react to detected obstacles in close proximity to the vehicle. In this way, if an obstacle in close proximity to the vehicle is detected, the vehicle may have sufficient time and/or ability to evade the obstacle and prevent a collision. Thus, greater detail (e.g. a greater cell density/a higher resolution/a reduced cell size) may be desirable within close proximity of the vehicle, and reduced detail (e.g., lesser cell density/lower resolution/increased cell size)

at a greater distance from the vehicle may be acceptable. Conversely, if the vehicle is traveling at a relatively high velocity, the vehicle may be generally unable to maneuver away from or evade an obstacle in close proximity to the vehicle; however, the vehicle may still be very capable of innovating an obstacle a significant distance from the vehicle and thereby avoid a collision. In this manner, the occupancy grid manager may reduce a cell density or resolution in close proximity to the vehicle, and the occupancy grid manager may include a cell density or resolution for an area farther away from the vehicle. The one or more processors of the occupancy grid manager may select between available configurations of occupancy grid densities/resolutions using any criteria, without limitation. According to one aspect of the disclosure, the one or more processors may receive data representing a velocity of the vehicle, and if the velocity is within a predetermined range, the one or more processors may implement a first mode in which a region of the grid corresponding to a close proximity of the vehicle has high cell density/high-resolution, and in which a region of the grid corresponding to a far distance from the vehicle has a low cell density/low resolution. Conversely, and if the velocity is outside of the predetermined range, the one or more processors may implement a second mode in which a region of the grid corresponding to a close proximity of the vehicle has a low cell density/low resolution, and in which a region of the grid corresponding to a far distance from the vehicle has a high cell density/high-resolution/small cell size.

According to another aspect of the disclosure, the occupancy grid manager may selected the non-uniformity based on vehicle location or a quality of the vehicle's surroundings. For example, if the vehicle is in a city, a congested area, or on a road that is not a highway (e.g. interstate-Highway, Autobahn, etc.), the occupancy grid manager may configure the occupancy grid to have a higher cell density/higher resolution in a close proximity to the vehicle and a lower cell density/lower resolution farther away from the vehicle. Conversely, if the vehicle is on a highway, it may be expected that the vehicle may travel at a high velocity or that obstacles may maintain a significant distance from the vehicle, and thereby the occupancy grid manager may select an occupancy grid configuration in which a higher cell density/higher resolution is used for a region corresponding to a distance from the vehicle, and a lower cell density/lower resolution is utilized for a region corresponding to a close proximity of the vehicle. The one or more processors of the occupancy grid manager may make such determinations based on any sensor data, without limitation. For example, the one or more processors may select an occupancy grid configuration based on position system data (e.g. global positioning system data, map data, telecommunications triangulation data, etc.).

According to another aspect of the disclosure, the occupancy grid manager may situationally select the non-uniformity. For example, the vehicle may be configured to proceed along a predetermined route or toward a predetermined destination. The occupancy grid manager may select occupancy grid areas such that a greater cell density/higher resolution is present in the areas of the occupancy grid that correspond to the predetermined route or direction of the destination, and a lower cell density/lower resolution may be present in the areas of the occupancy grid that correspond to areas outside of the predetermined route or direction of the destination.

According to an aspect of the disclosure, a non-uniform occupancy grid may permit increased range of the occupancy grid relative to the vehicle. That is, because conventional occupancy grids require significant computational resources, the computational resources available for conventional occupancy grids may become a scarce resource that requires adaptation and compromise in other occupancy grid variables. For example, a range of the occupancy grid may conventionally be limited such that the overall computational burden falls within a range of acceptability for the available processors. By employing a non-uniform occupancy grid, the overall computational burden is reduced. This reduced computational burden may permit an extension of the range of the non-uniform occupancy grid. Otherwise stated, by simplifying the computations for a given subset of cells, the overall grid can be expanded to include more computations or cover a greater range.

Figure 5:
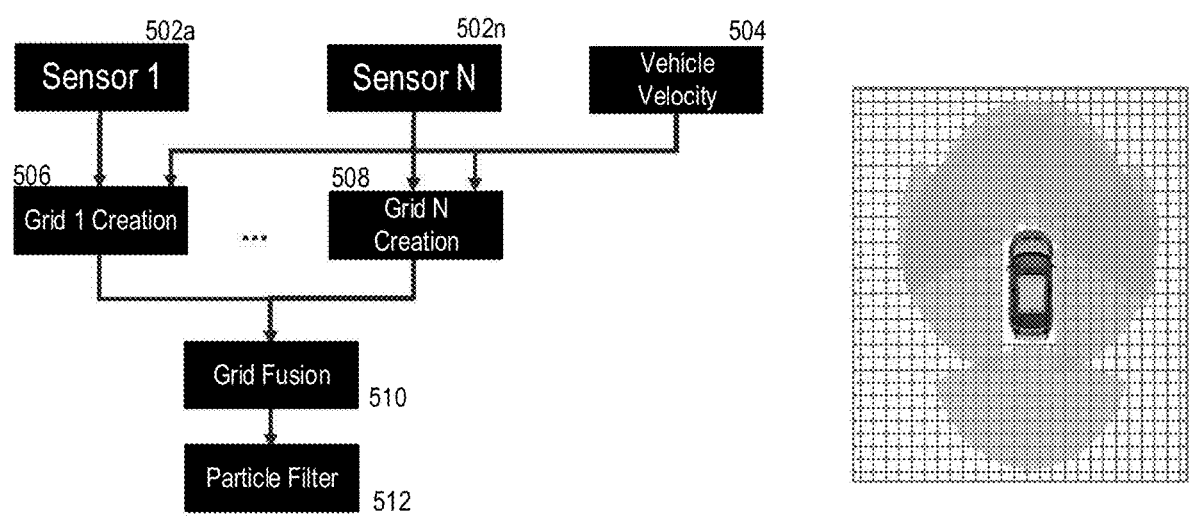
FIG. 5 depicts a series of steps for operation of an occupancy grid.

FIG. 5 depicts a series of steps for operation of an occupancy grid, according to an aspect of the disclosure. The vehicle may be equipped with one or more sensors, indicated in FIG. 5 as sensor one 502a through sensor n 502n. The vehicle may also be configured with one or more sensors which may provide the one or more processors with sensor data representing, for example, a vehicle velocity 504. The occupancy grid manager may receive the vehicle velocity in any manner, without limitation. A non-limiting list of vehicle velocity data includes speedometer data, accelerometer data, image sensor data (e.g. one or more cameras, one or more lidar sensors, one or more radar sensors, position system data, etc.), or any other data providing velocity information or from which the occupancy grid manager may derive the velocity. The one or more processors of the grid occupancy manager may be configured to derive vehicle velocity information from the one or more sensors 504.

Once the sensor data has been received, the occupancy grid manager may convert the sensor measurements at time t into an input grid 506 and 506. This may require mapping the detections from Cartesian space into an occupancy value of one or more grid cells. The one or more processors of the grid occupancy manager may perform these actions independently for each sensor, if desired. That is, if desired, separate grids may be configured for each sensor, or for multiple combinations of sensors.

Next, the one or more processors may combine the sensor grids into one common grid 510, which may be known as the scan grid. The occupancy grid manager may combine the scan grid 510 with a predicted grid of t−1 using one or more probability theories, such as, e.g. Dempster Shafer. The one or more processors may then input this resulting grid into the particle filter. The particle filter may track the dynamic cells in the grid. The particle filter may generate an updated dynamic grid representation. The one or more processors of the occupancy grid manager may perform any of the steps above, and the one or more processors may carry out any of the actions of the grid fusion 510 and/or the particle filter 512.

Figure 6:
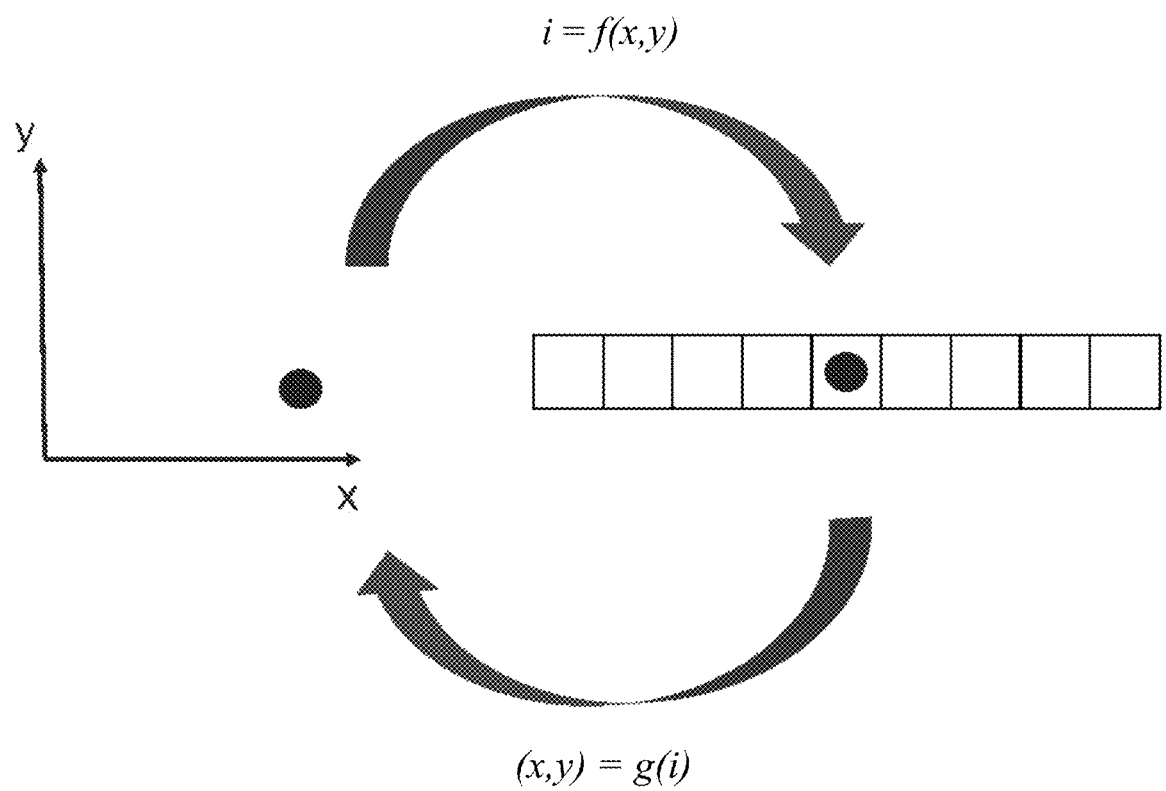
FIG. 6 depicts a mapping function to map data from Cartesian space to an array index.

FIG. 6 depicts a mapping function to map data from Cartesian space to an array index. According to one aspect of the disclosure, the occupancy grid may perform the mapping from Cartesian space to an array index using two functions. First, the one or more processors of the occupancy grid manager may include a function $f(x,y)$ that converts a point in Cartesian space into an index to the array that holds the information about the grid cells. Conversely, the one or more processors of the occupancy grid manager may include a function $g(i)$ that converts the index of a grid cell back to Cartesian space. Given the nature of occupancy grid mapping, the functions ƒ & g are generally not bijective, as g will return the Cartesian position of the center point of the grid cell.

When the occupancy grid is uniform (e.g. when all areas of the occupancy grid have the same cell density/the same resolution), ƒ(x,y) and g(i) may be linear functions that map x,y position to the array index & back. The occupancy grid manager may derive the function g(i) from ƒ(x,y).

When the occupancy grid is non-uniform (e.g. when at least two areas of the occupancy grid have different cell densities/different resolutions), the linearity might no longer be given, for example, if the cell size increases with distance from the vehicle. In this potentially nonlinear scenario, the occupancy grid manager may implement the mapping functions ƒ & g in any of a plurality of ways.

According to a first aspect of the disclosure, the occupancy grid manager may use multiple grids with different resolutions functions, which may function together to operate as the non-uniform occupancy grid. That is, the occupancy grid manager may calculate a first uniform grid for a first range, and a second uniform grid for a second range. The functions ƒ(x.y) and g(i) for each of the first uniform grid and the second uniform grid may be linear functions. This allows the use of linear functions for the uniform grids. There needs to be just one indirection to select the right grid for the given position.

Figure 7:
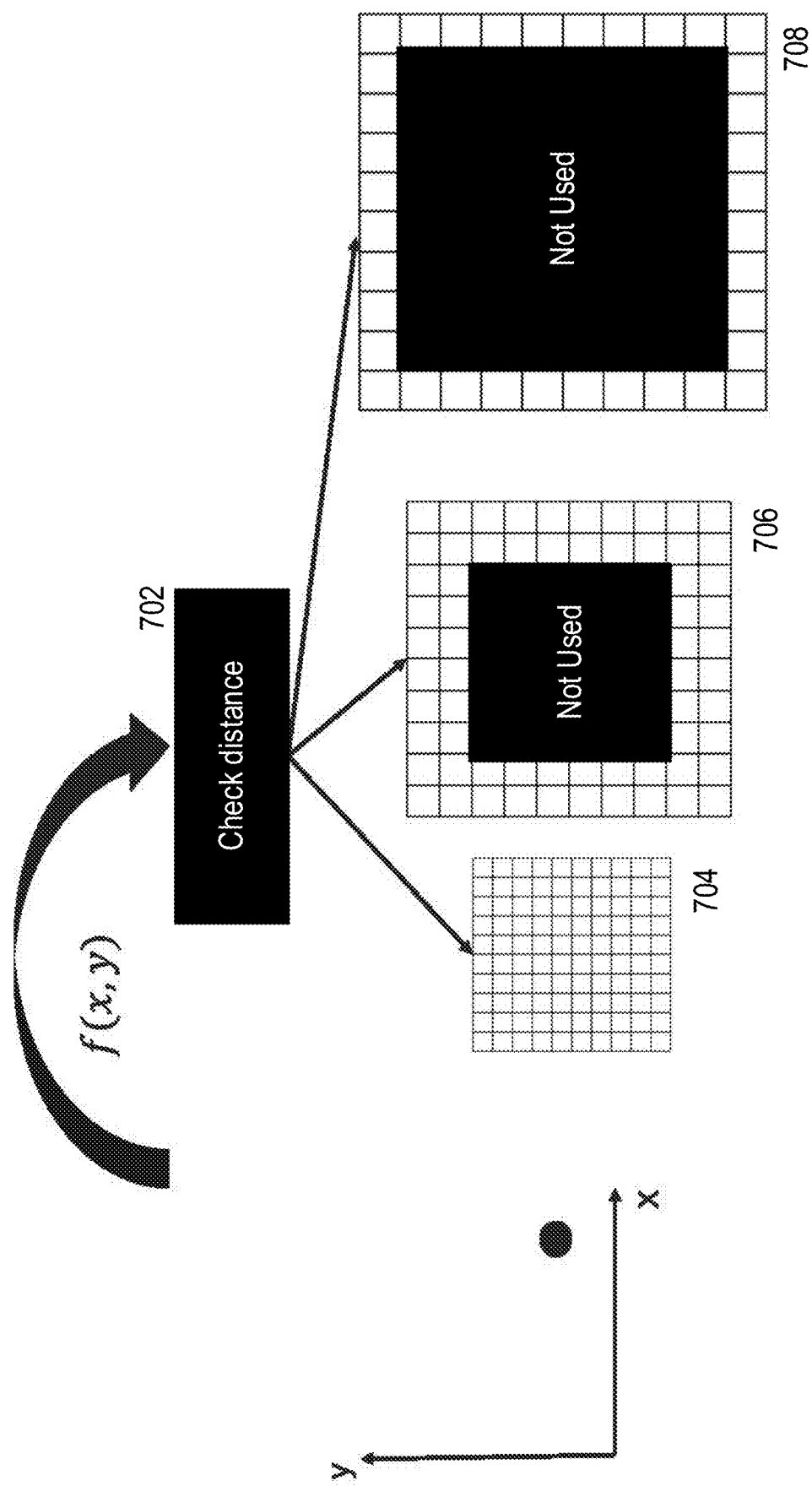
FIG. 7 depicts the use of multiple linear functions for a first uniform grid and a second uniform grid.

FIG. 7 depicts the use of multiple linear functions for a first uniform grid and a second uniform grid, according to an aspect of the disclosure. In this example, a distance from the vehicle is determined 702 and applied to the linear occupancy grid. In this configuration, and for demonstrative purposes, the cell density decreases with increased distance from the vehicle. That is, a first region 704, closest to the vehicle, has the greatest cell density; a second region 706 farther from the vehicle than the first region 704, has a lower cell density than the first region; and a third region 708, farther from the vehicle than the second region 706, has a lower cell density than the second region 806. This permits the use of linear functions for operating between occupancy grids. Nevertheless, this solution increases memory overhead, as three different occupancy grids with different cell densities, along with their corresponding linear functions, require consideration.

According to a second aspect of the disclosure, a mapping function that directly converts a given x,y position to a dedicated array index may be defined. Each range may define an area within the Cartesian space with a uniform cell size. A lower bound may correspond to the smaller range and the higher bound may correspond to the given range. The occupancy grid manager may split this space into a plurality of regions (four regions are depicted herein, although any number of regions would be possible) and calculate for each region the starting index, based on the amount of cells need to be stored for the previous regions. Within each of the regions, the occupancy grid manager may use a linear function to calculate the final index.

FIG. 8 depicts the application of mapping function to the Cartesian space according to the second aspect of the disclosure. In this figure, the Cartesian space around a vehicle is depicted. Each range may define an area within the Cartesian space with a uniform cell size. A lower bound may correspond to the smaller range, and the higher bound may correspond to the given range. The occupancy grid manager may split this space into a plurality of regions (four regions are depicted herein, although any number of regions would be possible) and calculate for each region the starting index, based on the amount of cells need to be stored for the previous regions. For example, in FIG. 8, the regions are depicted as a first region A 802, a second region B 804, a third region C 806, and a fourth region D 808. Within each of the regions, the occupancy grid manager may use a linear function to calculate the final index.

For demonstrative purposes, a sample mapping function corresponding to FIG. 8 for use with the occupancy grid manager may be as follows:

```
int32_t Non-uniformIndexCalculator::getIndex(const Position &pos) const
{
    int32_t index = -1;
uint32_t col, row;
if(pos.x >= mStartDistance)
{
    col = floor((mEndDistance - pos.x) / mCellSize);
    row = floor((mEndDistance - pos.y) / mCellSize);
    index = (col * mRows) + row + mIndexOffset;
}
else if( fabs(pos.x) >= mStartDistance)
{
    col = floor((fabs(pos.x) -mStartDistance) / mCellSize);
    row = floor((mEndDistance - pos.y) / mCellSize);
    index = (col * mRows) + row + mIndex0 ;
}
else if(pos.y >= mStartDistance)
{
    col = floor((mStartDistance - pos.x) / mCellSize);
    row = floor((mEndDistance - pos.y) / mCellSize);
    index = (col * mInnerRows) + row + mIndex1;
}
else if( fabs(pos.y) >= mStartDistance)
{
    col = floor((mStartDistance - pos.x) / mCellSize);
    row = floor((fabs(pos.y) - mStartDistance) / mCellSize);
    index = (col * mInnerRows) + row + mIndex2;
}
else
{
    index = -1;
}
    return index;
}
Position Non-uniformIndexCalculator::getPosition(int32_t index) const
{
    Position pos;
    int32_t resultingIndex, col, row;
    if(index < mIndex0)
    {
resultingIndex = index - mIndexOffset;
        row = resultingIndex % mRows;
        col = floor((resultingIndex -row) / mRows);
        pos.x = mEndDistance - (col * mCellSize) - 0.5 * mCellSize;
        pos.y = mEndDistance - (row * mCellSize) - 0.5 * mCellSize;
    }
    else if(index < mIndex1)
    {
        resultingIndex = index - mIndex0;
        row = resultingIndex % mRows;
        col = ((resultingIndex -row) / mRows);
        pos.x = -1 * (mStartDistance + (col * mCellSize) + 0.5 * mCellSize);
        pos.y = mEndDistance - (row * mCellSize) - 0.5 * mCellSize;
    }
    else if(index < mIndex2)
    {
        resultingIndex = index - mIndex1;
        row = resultingIndex % mInnerRows;
        col = ((resultingIndex -row) / mInnerRows);
        pos.x = mStartDistance - (col * mCellSize + 0.5 * mCellSize);
        pos.y = mEndDistance - (row * mCellSize + 0.5 * mCellSize);
    }
    else
    {
        resultingIndex = index - mIndex2;
        row = resultingIndex % mInnerRows;
        col = ((resultingIndex -row) / mInnerRows);
        pos.x = mStartDistance - (col * mCellSize + 0.5 * mCellSize);
        pos.y = -1 * (mStartDistance + (row * mCellSize + 0.5 *
```

```
        mCellSize));
    }
    return pos;
}
```

As the non-uniform grid cell size may depend on the distance from the vehicle, the static occupancy within the cells may require motion compensation when the vehicle is moving. In the uniform regions of the grid, this may merely require copying the data from the previous cell position to the new cell. Nevertheless, for the cells on a border between two regions, (e.g., the cells that transition to a cell with different cell size), mere copying of data is not directly possible. Several strategies may be available to combine information of multiple cells into a single cell or vice versa. That is, several strategies may be available to determine the occupancy value of the resulting cell(s).

For the transition from multiple cells to a single cell, the occupancy grid manager may implement the transition by calculating a maximum occupancy of the multiple cells and store the calculated maximum occupancy as the occupancy of the larger, resulting cell. Alternatively, the occupancy grid manager may calculate a medium or average occupancy of the multiple cells and store the calculated medium or average as the occupancy of the larger resulting cell.

Figure 9:
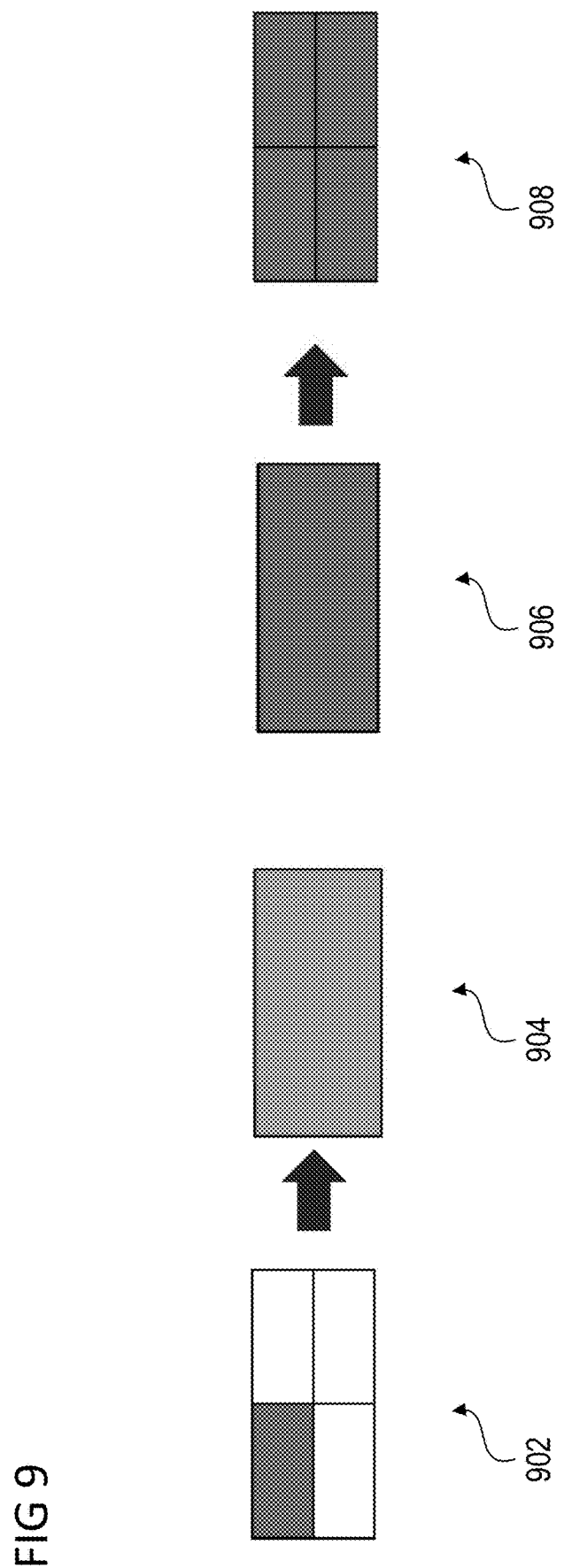
FIG. 9 depicts a transition from multiple smaller cells to a larger cell.

FIG. 9 shows this transition from multiple smaller cells 902 (e.g. cells with a greater cell density/resolution) to a larger cell 904 (e.g. cell with a lower cell density/lower resolution). In this case, the occupancies of the four cells at 902 are averaged, and the result is entered into cell 904.

For the transition from a single larger cell to multiple smaller cells, the occupancy grid manager may assign some or all of the multiple smaller cells the value of the previous cell. FIG. 9 shows this transition from a larger cell 906 (e.g. a cell with a lower cell density/lower resolution) to multiple smaller cells 908 (e.g. cells with a greater cell density/ resolution). In this case, the occupancy entry of larger cell 906 is carried over to each of the smaller cells at 908.

Once the values have been assigned, the occupancy grid manager may subject the new values to the particle filter. The particle filter utilizes a set of particles or data samples to represent a posterior distribution of a statistical process in light of noisy or partial observations. As each particle in the particle filter corresponds to a Cartesian position, the non-uniform grid does not require further adaptation. The occupancy grid manager may select an appropriate mapping function, as described above, to map from a Cartesian position to the cell index.

The configuration of the non-uniform resolution (e.g., the location and/or size of a first region of a first cell density and the location and/or size of a second region of a second cell density) can be modified during runtime. This can be achieved without additional overhead during the ego motion compensation step. To achieve this, the occupancy grid manager may configure the target grid from the motion compensation in the new configuration. The occupancy grid manager may retrieve the new information from the previous grid using the g(i) function of the previous configuration. The occupancy grid manager may then insert the motion compensated information using the $f(x,y)$ function of the new configuration.

Figure 10:
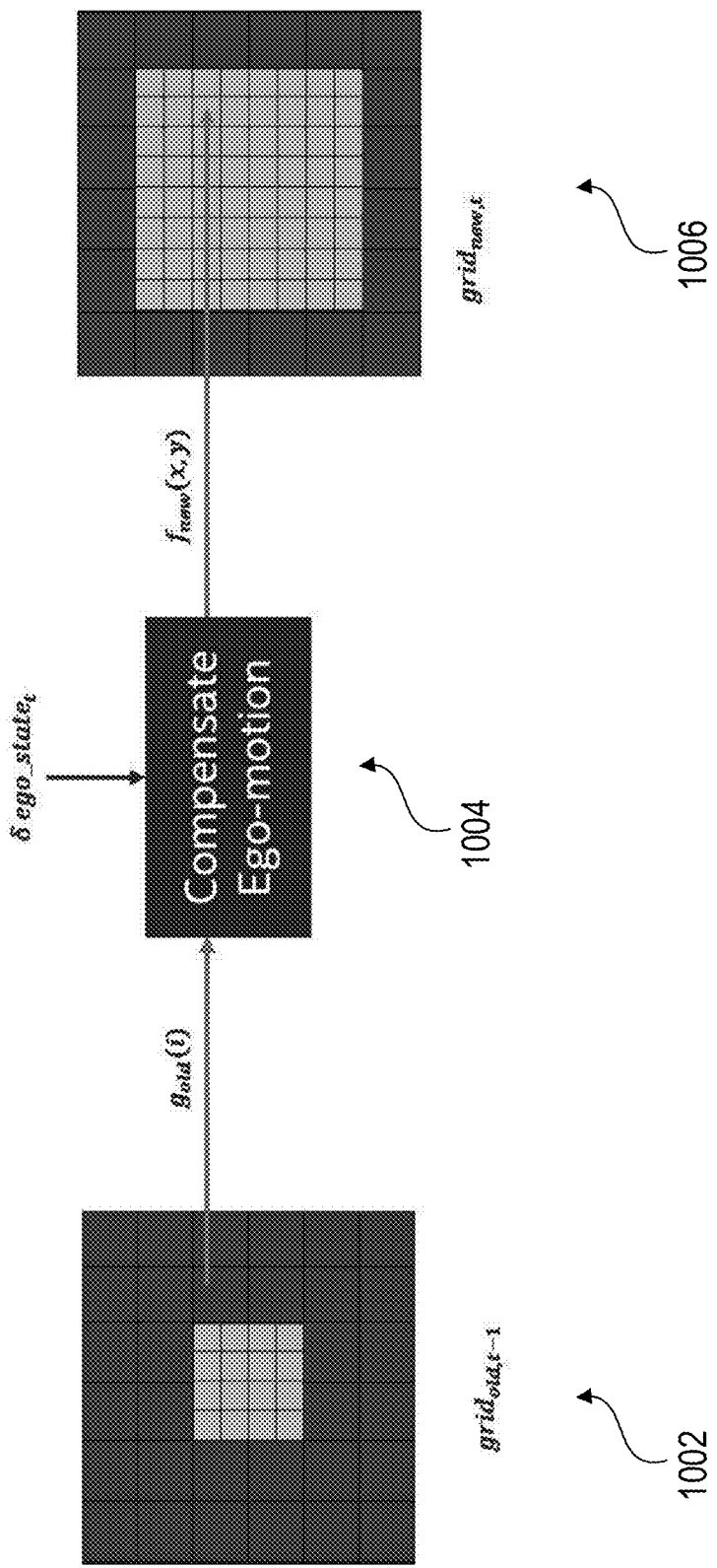
FIG. 10 depicts modification of the occupancy grid.

FIG. 10 depicts modification of the occupancy grid, according to an aspect of the disclosure. In this case, a first occupancy grid 1002 is depicted as having a first region, located centrally and in close proximity to the vehicle, having a high cell density/high cell resolution (e.g. small cell size) and a second region, located farther from the vehicle than the first region, and having a comparatively low cell density/low cell resolution (e.g. large cell size). The occupancy grid manager may reconfigure the occupancy grid in any way described herein. This may include, but is not limited to, changing a location of a region with a first cell density within the grid; changing a size of a region with a first cell density within the grid; switching the cell densities of two regions within the grid, or otherwise. In this particular example, the first region is expanded such that portions that previously belonged to the second region in 1002 are be configured as portions of the first region in 1006. The occupancy grid manager may convert cell information (e.g. occupancy information) from the cells of 1002 from Cartesian space to an array using g(i). The occupancy grid manager may adjust the array data to compensate for the motion of the vehicle 1004, thereby storing updated information in the arrays. The information contained within the arrays may then be converted to Cartesian space in the reconfigured grid 1006 using $f(x.y)$.

Figure 11:
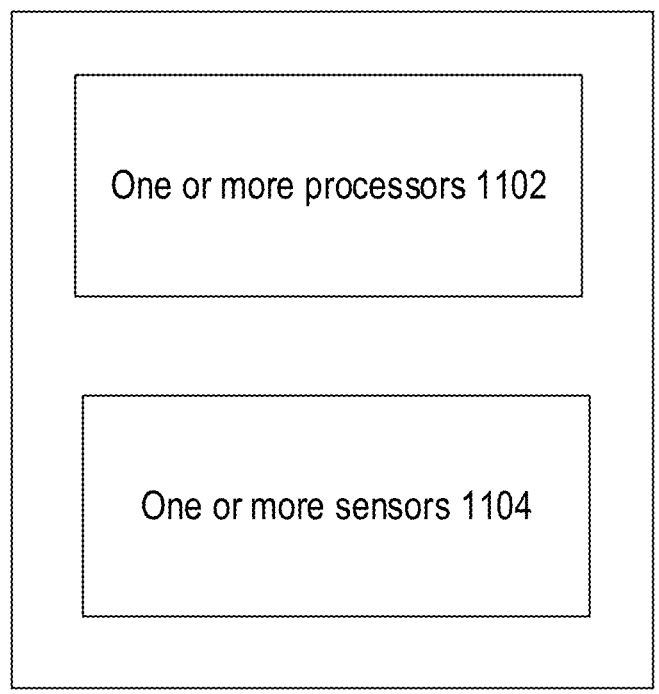
FIG. 11 depicts an occupancy grid manager.

FIG. 11 depicts an occupancy grid manager 1100, according to an aspect of the disclosure, the occupancy grid manager including an occupancy grid, the occupancy grid including: a plurality of cells, configurable in a plurality of cell sizes, each cell representing a region relative to a vehicle; and one or more processors 1102, configured to determine one or more context factors; select a cell size for a cell of the plurality of cells based on the one or more context factors; and determine from sensor data a probability of whether a region relative to the vehicle corresponding to the cell and the selected cell size is occupied. The occupancy grid manager may be configured to receive the sensor data from one or more sensors 1104, which may be optionally included as part of the occupancy grid manager.

Figure 12:
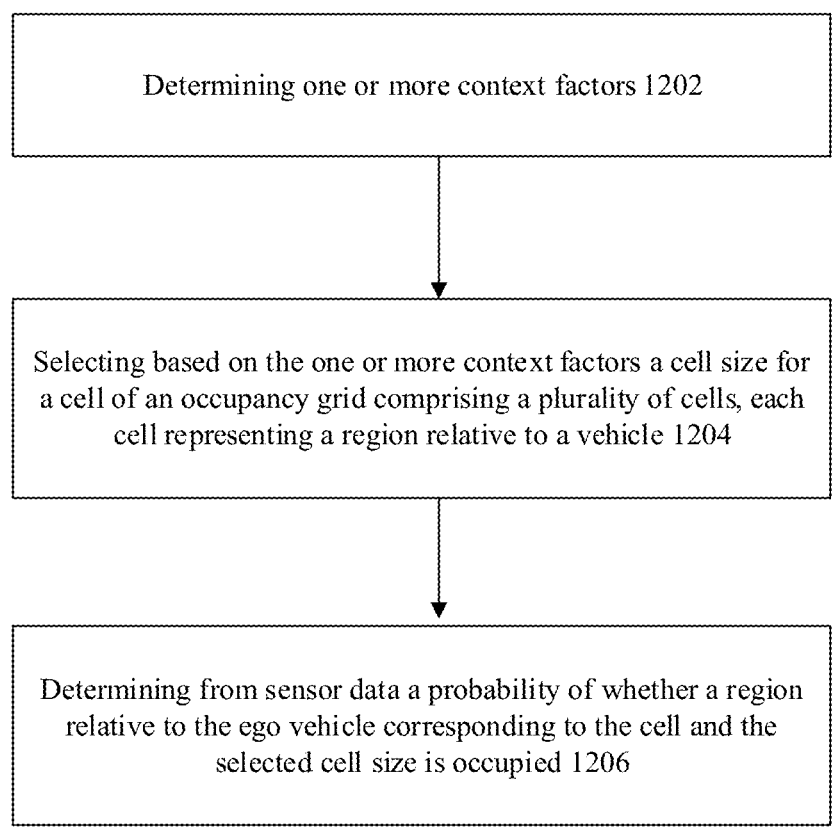
FIG. 12 depicts a method of occupancy grid management.

FIG. 12 depicts a method of occupancy grid management, including determining one or more context factors 1202; selecting based on the one or more context factors a cell size for a cell of an occupancy grid including a plurality of cells, each cell representing a region relative to a vehicle 1204; and determining from sensor data a probability of whether a region relative to the vehicle corresponding to the cell and the selected cell size is occupied 1206.

The occupancy grid manager may select a cell size for one or more cells based on one or more context factors. The context factors may be any factors whatsoever, including, but not limited to, a velocity of the vehicle, an acceleration of the vehicle, a traffic density in a vicinity of the vehicle, or a type of roadway on which the vehicle is traveling, a location of the vehicle, an object density of an area surrounding the vehicle, or otherwise. The occupancy grid manager may obtain this information through any means whatsoever. Autonomous vehicles are conventionally equipped with a plurality of sensors to detect information about an area in a vicinity of the vehicle. These sensors may include image sensors (e.g. cameras, video cameras, infrared cameras, lidar, radar), one or more wireless transceivers, one or more positioning system receivers (e.g. global Positioning System receivers), or otherwise. The one or more processors may receive sensor data from one or more sensors and may determine from the received sensor data a context factor. For example, the one or more processors may determine from a velocity sensor or from image sensor data a velocity of the vehicle and may alter the occupancy grid based on this receive context factor information. Alternatively or additionally, the one or more processors may receive context factor information directly from one or more sensors, such as receiving a context factor from a wireless connection or otherwise.

As stated above, the one or more processors may alter the occupancy grid based on the one or more context factors. The arrangement of regions of differing cell densities/resolutions/sizes within the occupancy grid is highly-configurable and can be implemented as desired for a given purpose or installation. By way of example, however, and considering an example in which only two cell density/resolutions/sizes are used, the occupancy grid could be configured as follows:

|  | Inner region, small cell size | Inner region, large cell size | Outer region, small cell size | Outer region, large cell size |
| --- | --- | --- | --- | --- |
| High Velocity |  | X | X |  |
| Low Velocity | X |  |  | X |
| High Traffic Density | X |  |  | X |
| Low Traffic Density | X |  | X |  |
| Highway |  | X | X |  |

It is noted that the occupancy grid configuration may alternatively include three or more regions of differing cell densities/resolutions/sizes. Furthermore, a given implementation of the occupancy grid may not associate the same relative cell sizes with the same context factors listed above; rather, this is provided as a demonstrative example of a possible configuration.

According to another aspect of the disclosure, the vehicle may include a user-activated switch, and the one or more processors may be configured to switch between occupancy grid configurations based on receipt of a signal from the user-activated switch. In this case, the user-activated switch may be any switch whatsoever, whether mechanical, digital, or otherwise, and may be configured to indicate a desire of the user to switch occupancy grid configurations. The one or more processors may be configured with a plurality of occupancy grid formations (e.g., low density in an inner portion and high density in an outer portion; high density in the inner portion and low density in an outer portion; a three-section grid having at least two different densities; a four-section grid having at least two different densities etc.). Based on a signal received from the user activated switch, the one or more processors may switch or toggle between the various occupancy grid formations.

The occupancy grid may include two or more cell groups, each cell group having a different cell density, a different cell resolution, and/or cells of a different size from the cells of another cell group. The number of cell groups in the occupancy grid is not limited to 2, but rather can be any number of cell groups, without limitation.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

Additional aspects of the disclosure will be provided by way of example:

In Example 1, an occupancy grid manager, including: an occupancy grid, the occupancy grid including: a plurality of cells, configurable in a plurality of cell sizes, each cell representing a region of an environment of a vehicle; and one or more processors, configured to: determine one or more context factors; select a cell size for a cell of the plurality of cells based on the one or more context factors; process sensor data provided by one or more sensors; and determine a probability that the cell of the plurality of cells is occupied based on the sensor data.

In Example 2, the occupancy grid manager of Example 1, wherein the one or more processors are further configured to store the probability corresponding to the cell.

In Example 3, the occupancy grid manager of Example 1 or −1, wherein the one or more context factors include any one or more of a velocity of the vehicle, an acceleration of the vehicle, a traffic density in a vicinity of the vehicle, or a type of roadway on which the vehicle is traveling.

In Example 4, the occupancy grid manager of any one of Examples 1 to −1, wherein the sensor data includes at least one of image sensor data, camera data, LIDAR sensor data, Radar sensor data, ultrasound sensor data, map data, position data, or any combination thereof.

In Example 5, the occupancy grid manager of any one of Examples 1 to −1, wherein the one or more processors are configured to determine the one or more context factors from measurement data.

In Example 6, the occupancy grid manager of any one of Examples 1 to −1, wherein the one or more processors are configured to determine the one or more context factors from at least one of speedometer data, traffic data, or roadway data.

In Example 7, the occupancy grid manager of any one of Examples 1 to −1, wherein the one or more processors are configured to determine the one or more context factors from a user-actuated switch.

In Example 8, the occupancy grid manager of any one of Examples 1 to −1, wherein the occupancy grid is a dynamic occupancy grid.

In Example 9, the occupancy grid manager of any one of Examples 1 to −1, wherein the occupancy grid further includes a first cell group containing cells of a first cell size and a second cell group containing cells of one or more second cell sizes, different from the first cell size.

In Example 10, the occupancy grid manager of Example −1, wherein the one or more processors are further configured to change a cell size of the first cell group based on the one or more context factors.

In Example 11, the occupancy grid manager of Example −1, wherein the one or more processors are further configured to change a cell size of one or more cells of the second cell group to the first cell size.

In Example 12, the occupancy grid manager of any one of Examples 1 to −1, wherein the occupancy grid further includes a first cell group containing cells of a first cell size and a second cell group containing cells of a second cell size, different from the first cell size, and wherein the one or more processors are further configured to change the cell size of the first cell group to the second cell size, and to change the cell size of the second cell group to the first cell size, based on the one or more context factors.

In Example 13, a method of occupancy grid management, including: determining one or more context factors; selecting based on the one or more context factors a cell size for a cell of an occupancy grid including a plurality of cells, each cell representing a region of an environment of a vehicle; processing sensor data provided by one or more sensors; and determining a probability that the cell of the plurality of cells is occupied based on the sensor data.

In Example 14, the method of occupancy grid management of Example 13, further including storing the probability corresponding to the cell.

In Example 15, the method of occupancy grid management of Example 13 or 14, wherein the one or more context factors include any one or more of a velocity of the vehicle, an acceleration of the vehicle, a traffic density in a vicinity of the vehicle, or a type of roadway on which the vehicle is traveling.

In Example 16, the method of occupancy grid management of any one of Examples 0 to −1, wherein the sensor data includes at least one of image sensor data, camera data, LIDAR sensor data, Radar sensor data, ultrasound sensor data, map data, position data, or any combination thereof.

In Example 17, the method of occupancy grid management of any one of Examples 0 to −1, further including determining the one or more context factors from measurement data.

In Example 18, the method of occupancy grid management of any one of Examples 0 to −1, further including determining the one or more context factors from at least one of speedometer data, traffic data, or roadway data.

In Example 19, the method of occupancy grid management of any one of Examples 0 to −1, further including determining the one or more context factors from a user-actuated switch.

In Example 20, the method of occupancy grid management of Example 0, wherein the occupancy grid is a dynamic occupancy grid.

In Example 21, the method of occupancy grid management of any one of Examples 0 to −1, wherein the occupancy grid further includes a first cell group containing cells of a first cell size and a second cell group containing cells of one or more second cell sizes, different from the first cell size.

In Example 22, the method of occupancy grid management of Example −1, further including changing a cell size of the first cell group based on the one or more context factors.

In Example 23, the method of occupancy grid management of Example −1, further including changing a cell size of one or more cells of the second cell group to the first cell size.

In Example 24, the method of occupancy grid management of any one of Examples 0 to −1, wherein the occupancy grid further includes a first cell group containing cells of a first cell size and a second cell group containing cells of a second cell size, different from the first cell size, and wherein the one or more processors are further configured to change the cell size of the first cell group to the second cell size, and to change the cell size of the second cell group to the first cell size, based on the one or more context factors.

In Example 25, one or more non-transitory computer readable media containing instructions which, if executed, cause one or more processors to perform the method of any one of Examples 0 to −1.

In Example 26, a vehicle, including: an occupancy grid manager, including: an occupancy grid, the occupancy grid including: a plurality of cells, configurable in a plurality of cell sizes, each cell representing a region of an environment of a vehicle; and one or more processors, configured to: determine one or more context factors; select a cell size for a cell of the plurality of cells based on the one or more context factors; process sensor data provided one or more sensors; and determine a probability that the cell of the plurality of cells is occupied based on the sensor data.

In Example 27, the vehicle of Example 0, wherein the one or more processors are further configured to store the probability corresponding to the cell.

In Example 28, the vehicle of Example 0 or −1, wherein the one or more context factors include any one or more of a velocity of the vehicle, an acceleration of the vehicle, a traffic density in a vicinity of the vehicle, or a type of roadway on which the vehicle is traveling.

In Example 29, the vehicle of any one of Examples 0 to −1, wherein the sensor data includes at least one of image sensor data, camera data, LIDAR sensor data, Radar sensor data, ultrasound sensor data, map data, position data, or any combination thereof.

In Example 30, the vehicle of any one of Examples 0 to −1, wherein the one or more processors are configured to determine the one or more context factors from measurement data.

In Example 31, the vehicle of any one of Examples 0 to −1, wherein the one or more processors are configured to determine the one or more context factors from at least one of speedometer data, traffic data, or roadway data.

In Example 32, the vehicle of any one of Examples 0 to −1, wherein the one or more processors are configured to determine the one or more context factors from a user-actuated switch.

In Example 33, the vehicle of any one of Examples 0 to −1, wherein the occupancy grid is a dynamic occupancy grid.

In Example 34, the vehicle of any one of Examples 0 to −1, wherein the occupancy grid further includes a first cell group containing cells of a first cell size and a second cell group containing cells of one or more second cell sizes, different from the first cell size.

In Example 35, the vehicle of Example −1, wherein the one or more processors are further configured to change a cell size of the first cell group based on the one or more context factors.

In Example 36, the vehicle of Example −1, wherein the one or more processors are further configured to change a cell size of one or more cells of the second cell group to the first cell size.

In Example 37, the vehicle of any one of Examples 0 to −1, wherein the occupancy grid further includes a first cell group containing cells of a first cell size and a second cell group containing cells of a second cell size, different from the first cell size, and wherein the one or more processors are further configured to change the cell size of the first cell group to the second cell size, and to change the cell size of the second cell group to the first cell size, based on the one or more context factors.

In Example 38, a means for occupancy grid management, including: an occupancy grid, the occupancy grid including: a plurality of cells, configurable in a plurality of cell sizes, each cell for representing a region of an environment of a means for occupancy grid management; and one or more processors, for: determining one or more context factors; selecting a cell size for a cell of the plurality of cells based on the one or more context factors; analyzing sensor data provided by one or more sensors; and determining a probability that the cell of the plurality of cells is occupied based on the sensor data.

In Example 39, the means for occupancy grid management of Example 0, wherein the one or more processors are further configured to store the probability corresponding to the cell.

In Example 40, the means for occupancy grid management of Example 0 or −1, wherein the one or more context factors include any one or more of a velocity of the vehicle, an acceleration of the vehicle, a traffic density in a vicinity of the vehicle, or a type of roadway on which the vehicle is traveling.

In Example 41, the means for occupancy grid management of any one of Examples 0 to −1, wherein the sensor data includes at least one of image sensor data, camera data, LIDAR sensor data, Radar sensor data, ultrasound sensor data, map data, position data, or any combination thereof.

In Example 42, the means for occupancy grid management of any one of Examples 0 to −1, wherein the one or more processors are configured to determine the one or more context factors from measurement data.

In Example 43, the means for occupancy grid management of any one of Examples 0 to −1, wherein the one or more processors are configured to determine the one or more context factors from at least one of speedometer data, traffic data, or roadway data.

In Example 44, the means for occupancy grid management of any one of Examples 0 to −1, wherein the one or more processors are configured to determine the one or more context factors from a user-actuated switch.

In Example 45, the means for occupancy grid management of any one of Examples 0 to −1, wherein the occupancy grid is a dynamic occupancy grid.

In Example 46, the means for occupancy grid management of any one of Examples 0 to −1, wherein the occupancy grid further includes a first cell group containing cells of a first cell size and a second cell group containing cells of one or more second cell sizes, different from the first cell size.

In Example 47, the means for occupancy grid management of Example −1, wherein the one or more processors are further configured to change a cell size of the first cell group based on the one or more context factors.

In Example 48, the means for occupancy grid management of Example −1, wherein the one or more processors are further configured to change a cell size of one or more cells of the second cell group to the first cell size.

In Example 49, the means for occupancy grid management of any one of Examples 0 to −1, wherein the occupancy grid further includes a first cell group containing cells of a first cell size and a second cell group containing cells of a second cell size, different from the first cell size, and wherein the one or more processors are further configured to change the cell size of the first cell group to the second cell size, and to change the cell size of the second cell group to the first cell size, based on the one or more context factors.

In Example 50, the occupancy grid manager of any one of Examples 1 to 12, wherein the one or more context factors include a vehicle velocity, a route, a presence of one or more intersections along a route, a presence of one or more objects on a roadside shoulder, a presence of one or more objects in a vicinity of a road on which the vehicle is traveling, a presence of one or more pedestrians within a vicinity of the vehicle, or any combination thereof.

In Example 51, the occupancy grid manager of Example 50, wherein the one or more processors are configured to identify the one or more context factors based on sensor data.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. An occupancy grid manager, comprising:
    an occupancy grid, the occupancy grid comprising:
        a plurality of cells, configurable in a plurality of cell sizes, each cell representing a region of an environment of a vehicle; and
    one or more processors, configured to:
        determine one or more context factors of the vehicle;
        select a cell size for a cell of the plurality of cells based on the one or more context factors of the vehicle;
        process sensor data provided by one or more sensors; and
        determine a probability that the cell of the plurality of cells is occupied based on the sensor data.

2. The occupancy grid manager of claim 1, wherein the one or more processors are further configured to store the probability corresponding to the cell.

3. The occupancy grid manager of claim 1, wherein the one or more context factors of the vehicle include any one or more of a velocity of the vehicle, an acceleration of the vehicle, a traffic density in a vicinity of the vehicle, or a type of roadway on which the vehicle is traveling.

4. The occupancy grid manager of claim 1, wherein the sensor data comprises at least one of image sensor data, camera data, LIDAR sensor data, Radar sensor data, ultrasound sensor data, map data, position data, or any combination thereof.

5. The occupancy grid manager of claim 1, wherein the one or more processors are configured to determine the one or more context factors of the vehicle from measurement data;
    speedometer data, traffic data, roadway data, or any combination thereof.

6. The occupancy grid manager of claim 1, wherein the one or more processors are configured to determine the one or more context factors of the vehicle from a user-actuated switch.

7. The occupancy grid manager of claim 1, wherein the occupancy grid is a dynamic occupancy grid.

8. The occupancy grid manager of claim 1, wherein the occupancy grid further comprises a first cell group containing cells of a first cell size and a first cell density, and a second cell group containing cells of one or more second cell sizes, and one or more second cell densities, wherein the first cell size is different from at least one of the one or more second cell sizes, and wherein the first cell density is different from at least one of the second cell densities.

9. The occupancy grid manager of claim 8, wherein the one or more processors are further configured to change a cell size of the first cell group based on the one or more context factors of the vehicle.

10. The occupancy grid manager of claim 9, wherein the one or more processors are further configured to change a cell size of one or more cells of the second cell group to the first cell size.

11. The occupancy grid manager of claim 1, wherein the occupancy grid further comprises a first cell group containing cells of a first cell size and a second cell group containing cells of a second cell size, different from the first cell size, and wherein the one or more processors are further configured to change the cell size of the first cell group to the second cell size, and to change the cell size of the second cell group to the first cell size, based on the one or more context factors of the vehicle.

12. One or more non-transitory computer readable media containing instructions which, if executed, are configured to cause one or more processors to:
determine one or more context factors of the vehicle;
select based on the one or more context factors of the vehicle, a cell size for a cell of an occupancy grid comprising a plurality of cells, each cell representing a region of an environment of a vehicle;
process sensor data provided by one or more sensors; and
determine a probability that the cell of the plurality of cells is occupied based on the sensor data.

13. The one or more non-transitory computer readable media of occupancy grid management of claim 12, wherein the one or more context factors of the vehicle include any one or more of a velocity of the vehicle, an acceleration of the vehicle, a traffic density in a vicinity of the vehicle, or a type of roadway on which the vehicle is traveling.

14. The one or more non-transitory computer readable media of occupancy grid management of claim 12, wherein the sensor data comprises at least one of image sensor data, camera data, LIDAR sensor data, Radar sensor data, ultrasound sensor data, map data, position data, or any combination thereof.

15. The one or more non-transitory computer readable media of occupancy grid management of claim 12, wherein the occupancy grid further comprises a first cell group containing cells of a first cell size and a first cell density, and a second cell group containing cells of one or more second cell sizes and one or more second cell densities, wherein the first cell size is different from at least one of the one or more second cell sizes and/or wherein the first cell density is different from at least one of the one or more second cell densities.

16. The one or more non-transitory computer readable media of occupancy grid management of claim 15, wherein the instructions are further configured to cause the one or more processors to change a cell size of the first cell group based on the one or more context factors of the vehicle.

17. The one or more non-transitory computer readable media of occupancy grid management of claim 16, wherein the instructions are further configured to cause the one or more processors to change a cell size of one or more cells of the second cell group to the first cell size.

18. The one or more non-transitory computer readable media of occupancy grid management of claim 12, wherein the occupancy grid further comprises a first cell group containing cells of a first cell size and a second cell group containing cells of a second cell size, different from the first cell size, and wherein the one or more processors are further configured to change the cell size of the first cell group to the second cell size, and to change the cell size of the second cell group to the first cell size, based on the one or more context factors of the vehicle.

19. A means for occupancy grid management, including:
an occupancy grid, the occupancy grid including: a plurality of cells, configurable in a plurality of cell sizes, each cell for representing a region of an environment of a vehicle;
and one or more processors, for: determining one or more context factors of the vehicle;
selecting a cell size for a cell of the plurality of cells based on the one or more context factors of the vehicle;
analyzing sensor data provided by one or more sensors; and
determining a probability that the cell of the plurality of cells is occupied based on the sensor data.

20. The means for occupancy grid management of any claim 19, wherein the occupancy grid further includes a first cell group containing cells of a first cell size and a second cell group containing cells of a second cell size, different from the first cell size, and wherein the one or more processors are further configured to change the cell size of the first cell group to the second cell size, and to change the cell size of the second cell group to the first cell size, based on the one or more context factors of the vehicle.

* * * * *